United States Patent
Nakashima

(10) Patent No.: US 11,764,446 B2
(45) Date of Patent: Sep. 19, 2023

(54) LAMINATED BATTERY COMPRISING A TERMINAL COMPRISING A CLAD MATERIAL

(71) Applicant: PRIME PLANET ENERGY & SOLUTIONS, INC., Tokyo (JP)

(72) Inventor: Satoshi Nakashima, Toyota (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 31 days.

(21) Appl. No.: 17/536,300

(22) Filed: Nov. 29, 2021

(65) Prior Publication Data
US 2022/0181754 A1    Jun. 9, 2022

(30) Foreign Application Priority Data
Dec. 3, 2020 (JP) ................. 2020-201242

(51) Int. Cl.
*H01M 50/534* (2021.01)
*H01M 50/536* (2021.01)
(Continued)

(52) U.S. Cl.
CPC ....... *H01M 50/534* (2021.01); *H01M 50/183* (2021.01); *H01M 50/536* (2021.01); *H01M 50/543* (2021.01); *H01M 50/105* (2021.01); *H01M 50/178* (2021.01); *H01M 50/562* (2021.01); *H01M 2220/20* (2013.01)

(58) Field of Classification Search
CPC ............. H01M 50/534; H01M 50/543; H01M 50/183; H01M 50/536; H01M 50/178; H01M 50/105; H01M 50/562; H01M 2220/20
See application file for complete search history.

(56) References Cited

U.S. PATENT DOCUMENTS

2021/0234222 A1*   7/2021   Hiraki ................. H01M 50/172

FOREIGN PATENT DOCUMENTS

| JP | 2007-134233 A | 5/2007 |
| JP | 2016-004731 A | 1/2016 |

(Continued)

OTHER PUBLICATIONS

EPO machine generated English translation of KR20180106499A (Year: 2018).*

*Primary Examiner* — Christopher P Domone
*Assistant Examiner* — Kimberly Wyluda
(74) *Attorney, Agent, or Firm* — Finnegan, Henderson, Farabow, Garrett & Dunner, LLP

(57) ABSTRACT

A laminated battery disclosed herein includes an electrode body, a laminated exterior body, and positive and negative electrode terminals. At least one of the positive and negative electrode terminals is configured of a plate-shaped clad material in which a first metal and a second metal, which are different from each other, are joined to each other, and a tab film composed of a resin material is arranged on the surfaces of the first metal and the second metal of the clad material. The boundary region of the first metal and the second metal of the clad material is not exposed to the outside of the exterior body, and the tab film is arranged at a peripheral edge portion close to the boundary region, excluding the boundary region, on the wide surface of the clad material, and the tab film is welded to the exterior body.

7 Claims, 3 Drawing Sheets

(51) Int. Cl.
*H01M 50/105* (2021.01)
*H01M 50/178* (2021.01)
*H01M 50/562* (2021.01)
*H01M 50/543* (2021.01)
*H01M 50/183* (2021.01)

(56) References Cited

FOREIGN PATENT DOCUMENTS

JP 6227756 B2 11/2017
KR 20180106499 A * 10/2018 .......... H01M 50/564

* cited by examiner

LAMINATED BATTERY COMPRISING A TERMINAL COMPRISING A CLAD MATERIAL

CROSS REFERENCE TO RELATED APPLICATIONS

This application claims priority based on Japanese Patent Application No. 2020-201242 filed on Dec. 3, 2020, and the entire contents of the application are incorporated herein by reference.

BACKGROUND

1. Field of the Invention

The present disclosure relates to a laminated battery.

2. Description of the Background

In recent years, secondary batteries such as lithium-ion secondary batteries have become increasingly important as power sources mounted on vehicles or power sources for personal computers and mobile terminals. As one embodiment of this type of secondary batteries, a laminated battery is known in which an electrode body is housed in an electrode exterior body (hereinafter, referred to as a laminated exterior body) using a laminated film.

When constructing such a laminated battery, an electrode body is sandwiched as a power generation element between a pair of laminated films, and in this state, the peripheral portions of the films are pressurized and heated to be welded together. As a result, a bag-shaped laminated exterior body having a welded portion on the peripheral edge portion is formed, and the electrode body is housed inside the exterior body. The electrode body includes at least a positive electrode and a negative electrode. The positive electrode typically has a positive electrode active material layer including a positive electrode active material on a positive electrode current collector. Similarly, the negative electrode also typically has a negative electrode active material layer including a negative electrode active material on the negative electrode current collector. The laminated battery includes plate-shaped electrode terminals for connecting the electrode body inside the exterior body and an external device (another battery, a motor, and the like). Such electrode terminals are configured of a positive electrode terminal and a negative electrode terminal, one end portion of each terminal being connected to the respective electrode of the electrode body, and the other end portions being exposed to the outside of the exterior body from different positions.

It is preferable that the end portion of the electrode terminal on the side connected to the electrode body be configured of the same metal as the current collector of the respective electrode. Further, it is preferable that the end portion on the side exposed to the outside be selected from an appropriate metal in consideration of connection to an external device. In order to satisfy such requirements, it is known to use a clad material in which different metals (for example, copper and aluminum) are joined to each other as an electrode terminal. Where a boundary (interface) of dissimilar metals in such a clad material is exposed to an electrolytic solution and the outside air, electrolytic corrosion may occur. Various techniques have been conventionally proposed in order to prevent such interface corrosion. For example, in Japanese Patent Application Publication No. 2016-004731, a clad material in which copper and a second metal (for example, aluminum) are joined is used as a negative electrode terminal, a nickel plating layer is provided on the surface of copper, and a resin layer is provided so as to cover the interface between the two metals.

SUMMARY

However, in the method of Japanese Patent Application Publication No. 2016-004731, since the resin layer is provided on two different metals of the negative electrode terminals, the processing conditions for adhering each metal and the resin layer are different and a processing defect may occur. When such a processing defect occurs, the boundary (interface) of dissimilar metals may be exposed to the electrolytic solution or the outside air, and electrolytic corrosion may occur. Therefore, there is a demand for a battery in which the boundary (interface) of dissimilar metals is adequately protected in a sealed state.

The present disclosure has been made in view of such circumstances, and a main object thereof is to provide a laminated battery in which a boundary region of dissimilar metals is adequately protected in a sealed state by suitably welding the surface of each metal, excluding the boundary region of dissimilar metals, to a tab film and further welding the tab film and a laminated exterior body.

A laminated battery is provided to achieve the above objective. The laminated battery disclosed herein comprises an electrode body having a positive electrode and a negative electrode, a laminated exterior body which is formed of rectangular laminated films and inside which the electrode body is housed by welding the laminated films in a state where the wide surfaces face each other, and positive and negative electrode terminals that are electrically connected at one end to the respective electrode of the electrode body and are exposed at the other end to the outside from a welded portion of the exterior body. At least one of the positive and negative electrode terminals is configured of a plate-shaped clad material in which a first metal and a second metal, which are different from each other, are joined to each other, and in the terminal configured of the clad material, one end, which is connected to the respective electrode of the electrode body, is configured of the first metal, and the other end, which is exposed to the outside, is configured of the second metal. A tab film composed of a resin material is arranged on the surfaces of the first metal and the second metal of the clad material, and a boundary region of the first metal and the second metal of the clad material is not exposed to the outside of the exterior body. The tab film is arranged at a peripheral edge portion close to the boundary region, excluding the boundary region, on the wide surface of the clad material, and the tab film is welded to the welded portion of the exterior body.

In the above-described configuration, the tab film is arranged at the peripheral edge portion of the clad material close to the boundary region, excluding the boundary region, and the tab film and the surfaces of the first metal and the second metal are welded to each other. Further, the tab film and the laminated exterior body are welded together. Therefore, the processing conditions at the time of welding the tab film and each metal and at the time of welding the laminated exterior body and each metal via the tab film can be set as appropriate. As a result, each of the tab film, the electrode terminal, and the laminated exterior body can be suitably welded, and the boundary region of the dissimilar metals is appropriately protected in a sealed state. With such a configuration, it is possible to realize a laminated battery in which the adhesiveness (sealing property) of the laminated exterior body is improved and the boundary region between the dissimilar metals is protected without being exposed to the electrolyte (for example, electrolytic solution) and the outside air.

In a preferred embodiment of the laminated battery disclosed herein, the negative electrode terminal is configured of the clad material, the first metal is configured of copper, and the second metal is configured of aluminum. In another preferred embodiment, the positive electrode terminal is configured of the clad material, the first metal is configured of aluminum, and the second metal is configured of copper.

With such a configuration, although the positive and negative terminals are configured of different metal materials (copper and aluminum), a laminated battery in which electrolytic corrosion is prevented at the boundary between the dissimilar metals is provided.

In a preferred embodiment of the laminated battery disclosed herein, a nickel plating layer is provided on the surface of portions of the first metal and the second metal that are configured of copper.

With such a configuration, the adhesiveness between the electrode terminal, which is a metal material, and the tab film, which is a resin material, is further improved, so that the boundary between the dissimilar metals can be protected more adequately.

In a preferred embodiment of the laminated battery disclosed herein, the tab film is an acid-modified polyolefin resin.

An acid-modified polyolefin resin is a resin material that has high adhesiveness to resin materials and metal materials, and also has high resistance to electrolytes (for example, electrolytic solutions). By using such a resin material as a tab film, electrolytic corrosion at the boundary between the dissimilar metals can be prevented more suitably.

In a preferred embodiment of the laminated battery disclosed herein, the thickness of the positive and negative terminals is 1 mm or less.

With such a configuration, the laminated exterior body and the electrode terminals can be suitably heat-welded via the tab film.

DETAILED DESCRIPTION

Figure 1:
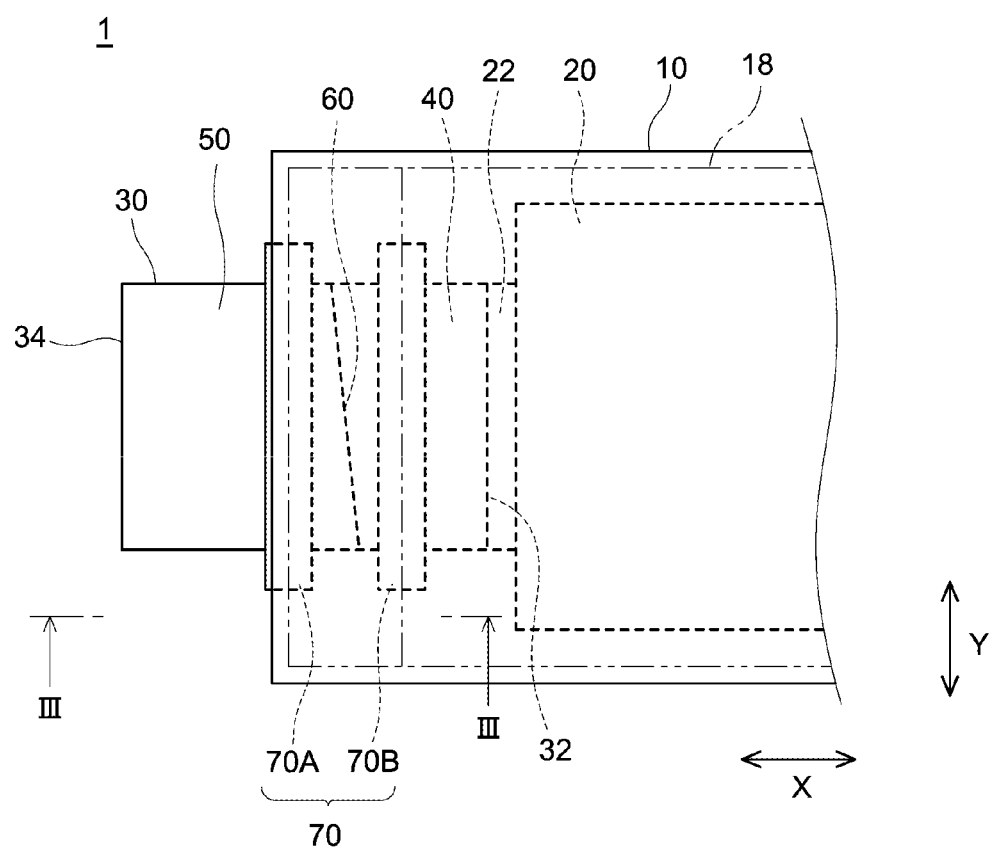
FIG. 1 schematically shows a laminated battery according to an embodiment.

Hereinafter, preferred embodiments of the present disclosure will be described with reference to the drawings. The embodiments described herein are obviously not intended to specifically limit the present disclosure. It should be noted that matters other than those specifically mentioned in the present specification and necessary for carrying out the present disclosure (for example, a general configuration of laminated battery that does not characterize the present disclosure) can be ascertained as design matters for a person skilled in the art that are based on the related art in the pertinent field. The present disclosure can be carried out based on the contents disclosed in the present specification and common technical knowledge in the pertinent field.

Further, reference numeral X in each figure indicates a "width direction", reference numeral Y indicates a "depth direction", and reference numeral Z indicates a "thickness direction". The dimensional relationship (length, width, thickness, etc.) does not reflect the actual dimensional relationship.

In the present specification, the "secondary battery" generally refers to a power storage device that can be recharged repeatedly, and thus is inclusive of a so-called storage battery (that is, a chemical battery) such as a lithium ion secondary battery, a nickel hydrogen battery, a nickel cadmium battery, and the like, and also an electric double-layer capacitor (that is, physical battery). Further, in the present specification, the "laminated battery" refers generally to all batteries that have a configuration in which a laminated film is used as an exterior body and an electrode body is housed therein. Hereinafter, the present disclosure will be described in detail by taking as an example a lithium ion secondary battery in which an electrode body is housed in a battery exterior body configured of a laminated film. The present disclosure is not intended to be limited to such an embodiment. The laminated battery may be, for example, an all-solid-state battery using a solid electrolyte, or a power storage element (physical battery) such as an electric double-layer capacitor.

FIG. 1 schematically shows a laminated battery according to an embodiment. As shown in FIG. 1, a laminated battery 1 includes a laminated exterior body 10, an electrode body 20, an electrode terminal 30, and an electrolyte (not illustrated). The electrode body 20 and the electrolyte serve as power generation elements of the laminated battery 1. The electrode body 20 and the electrolyte are sealed inside by heat-welding the laminated exterior body 10 at a welded portion 18 shown by a two-dot dashed line in FIG. 1.

The configuration of the electrode body 20 may be the same as that of a conventionally known battery, and is not particularly limited. The electrode body 20 includes one or more sheet-shaped positive electrodes (positive electrode sheets) and one or more sheet-shaped negative electrodes (negative electrode sheets), typically a plurality of each. The positive electrode sheets and the negative electrode sheets are alternately layered in a state of being insulated from each other. The configuration of the electrode body 20 is not particularly limited. The electrode body 20 may be, for example, a wound electrode body in which a positive electrode sheet and a negative electrode sheet are wound with a separator interposed therebetween.

For example, the positive electrode has a configuration in which a positive electrode active material layer is provided on a positive electrode current collector. As the positive electrode current collector, a metal positive electrode current collector used as the positive electrode current collector of this type of battery can be used without particular limitation. Typically, for example, the positive electrode current collector is composed of a metal material such as aluminum, nickel, titanium, stainless steel, and the like, which has good conductivity. In particular, aluminum (for example, aluminum foil) is preferable. As the positive electrode active material contained in the positive electrode active material layer, for example, a lithium transition metal composite oxide, a lithium transition metal phosphate, or the like can be used.

Further, for example, the negative electrode has a configuration in which a negative electrode active material layer is provided on a negative electrode current collector. As the negative electrode current collector, a metal negative electrode current collector used as the negative electrode current collector of this type of battery can be used without particular limitation. Typically, for example, the negative electrode current collector is configured of a metal material having good conductivity such as copper, a copper-based alloy, nickel, titanium, stainless steel, and the like. In particular, copper (for example, copper foil) is preferable. As the negative electrode active material contained in the negative electrode active material layer, for example, graphite or the like can be used.

The laminated battery 1 includes an electrolyte inside the laminated exterior body 10. The composition of the electrolyte may be the same as that of a conventionally known battery, and is not particularly limited. The electrolyte may be liquid, polymer (gel), or solid. As an example, a solution obtained by dissolving a lithium salt such as $LiPF_6$ in a nonaqueous solvent such as a carbonate can be used.

The separator insulates the positive electrode active material layer and the negative electrode active material layer. The separator may have the same configuration as that of a conventionally known battery, and is not particularly limited. As an example, a porous polyolefin sheet or the like can be used.

The laminated exterior body 10 is an insulating container that houses the power generation elements (electrode body 20 and electrolyte). The laminated exterior body 10 is formed in a bag shape by welding two rectangular laminated films with their wide surfaces facing each other. The power generation elements (electrode body 20 and electrolyte) are sealed in the bag-shaped space. However, the method for forming the laminated exterior body 10 is not limited to the above-mentioned method. For example, the laminated exterior body may be formed by folding one rectangular laminated film in half and forming in a bag shape by welding a portion other than the crease. Further, three or more laminated films may be laminated to form a bag shape.

The configuration of the laminated exterior body 10 may be the same as that conventionally known, and is not particularly limited. In the example shown in FIG. 3, the laminated exterior body 10 has a layered structure. The laminated exterior body 10 is configured of a laminated film with a multilayer structure having at least a plurality of resin film layers. The laminated film can typically have a three-layer structure having two resin film layers (sealant layer 12, protective layer 16) and a metal layer 14. For example, the laminated exterior body 10 is configured by layering the sealant layer 12, the metal layer 14, and the protective layer 16 in this order from the side closer to the electrode body 20.

The sealant layer 12 is for enabling heat welding. The sealant layer 12 is located as the innermost layer of the laminated exterior body 10, that is, on the side closest to the electrode body 20. The sealant layer 12 is configured of, for example, a thermoplastic resin. Examples of the thermoplastic resin include non-stretched polyolefin resins, biaxially stretched polyester resins, biaxially stretched polyamide resins, polystyrene resins, polyvinyl chloride resins, and the like. Examples of the non-stretched polyolefin resin include non-stretched polypropylene, non-stretched polyethylene, and the like.

The metal layer 14 blocks the flow of moisture, air, or gas generated inside the laminated battery 1 into and from the laminated battery 1. The metal layer 14 is configured of a metal material such as aluminum, iron, stainless steel, and the like. Of these, aluminum is preferable from the viewpoint of cost and weight reduction. The metal layer 14 may be, for example, an aluminum foil or an aluminum vapor-deposited layer.

The protective layer 16 is for improving the durability and impact resistance of the laminated exterior body 10. The protective layer 16 is located on the outer surface side of the metal layer 14. The protective layer 16 may be the outermost layer of the laminated exterior body 10. The protective layer 16 is configured of, for example, a biaxially stretched polyester resin, a biaxially stretched polyamide resin, or the like. Examples of the biaxially stretched polyester resin include biaxially stretched polyethylene terephthalate and the like.

Described hereinabove is the case in which the laminated exterior body 10 is configured to have a three-layer structure composed of the sealant layer 12, the metal layer 14, and the protective layer 16, but this configuration of the laminated exterior body 10 is not limiting. For example, the laminated exterior body may have a multi-layer structure of four or more layers. As an example, an adhesive layer may be provided between the layers described above to adhere the layers to each other. The adhesive layer may be configured of, for example, a resin such as a polyamide. Further, as another example, a printing layer, a flame retardant layer, a surface protective layer and the like may be further provided as, for example, the outermost layer on the protective layer 16.

The electrode body 20 is provided with current collecting tabs 22 (positive electrode current collecting tab, negative electrode current collecting tab). Specifically, the positive electrode current collecting tab extends outward from a wound or layered sheet-shaped positive electrode (specifically, a positive electrode current collector). The negative electrode current collecting tab extends outward from a wound or laminated sheet-shaped negative electrode (specifically, a negative electrode current collector). The current collecting tab 22 does not include an active material layer (positive electrode active material layer or negative electrode active material layer) and is exposed. The current collecting tabs 22 may extend in different directions from both edges of the electrode body 20 in the width direction X, or may extend in the same direction from different positions of the electrode body 20.

The electrode terminals 30 (positive electrode terminal, negative electrode terminal) are plate-shaped metal members. The thickness of the electrode terminal 30 is required to be 1 mm or less. For example, 900 μm or less is preferable, 800 μm or less is more preferable, and 700 μm or less is further preferable. As a result, the gap between the laminated exterior body 10 and the electrode terminal 30 in the welded portion 18 of the laminated exterior body 10 is within a predetermined range, so that the adhesiveness (sealing property) of the laminated exterior body 10 can be ensured. The lower limit of the thickness of the electrode terminal 30 is not particularly limited, but for example, 50 μm or more is preferable, 100 μm or more is more preferable, and 200 μm or more is further preferable.

The positive electrode terminal is electrically connected by joining to the positive electrode current collecting tab. The negative electrode terminal is electrically connected by joining to the negative electrode current collecting tab. Specifically, the positive electrode terminal extends further outward from the vicinity of the tip of the positive electrode current collecting tab and is exposed from the laminated exterior body 10. The negative electrode terminal extends further outward from the vicinity of the tip of the negative electrode current collecting tab and is exposed from the laminated exterior body 10.

The positive electrode terminal and the positive electrode current collecting tab are joined to each other at a joining portion. The negative electrode terminal and the negative electrode current collecting tab are joined to each other at a joining portion. As a joining method between the positive and negative electrode terminals and the positive and negative electrode current collecting tabs in such joining portions, conventionally known joining methods such as resistance welding, laser welding, and ultrasonic joining can be used without particular limitation.

The configuration of the electrode terminals 30 (positive electrode terminal, negative electrode terminal) of the laminated battery 1 disclosed herein will be described with reference to FIGS. 2 and 3. It should be noted that substantially the same configuration can be adopted for the positive electrode terminal and the negative electrode terminal.

At least one of the positive electrode terminal and the negative electrode terminal is configured of a clad material composed of two kinds of metal materials in which a first metal 40 and a second metal 50 are joined. When the electrode terminal 30 is configured of a clad material, the side of the electrode terminal 30 connected to the electrode body 20 with the current collecting tab 22 being interposed therebetween is configured of the first metal 40. Further, the side of the laminated exterior body 10 exposed to the outside is composed of the second metal 50.

The first metal 40 and the current collecting tab 22 are configured of the same metal material. For example, when the electrode terminal 30 is a positive electrode terminal, the first metal 40 is preferably configured of the same metal material as the above-mentioned positive electrode current collector, and is particularly preferably configured of aluminum. When the electrode terminal 30 is a negative electrode terminal, the first metal is preferably configured of the same metal material as the above-mentioned negative electrode current collector, and is particularly preferably configured of copper.

The second metal 50 may be configured of a metal material that has good conductivity and can be joined to the first metal 40. Examples of such metal materials include aluminum, nickel, titanium, copper, and the like. When the electrode terminal 30 is a positive electrode terminal and the first metal 40 is configured of aluminum, the second metal 50 is preferably configured of copper. When the electrode terminal 30 is a negative electrode terminal and the first metal 40 is configured of copper, the second metal 50 is preferably configured of aluminum.

Where the positive electrode terminal is configured of a clad material, the negative electrode terminal may be configured of a clad material or one kind of metal (that is, not a clad material). When the negative electrode terminal is not configured of a clad material, a general negative electrode terminal structure can be used in this type of laminated battery without particular limitation. Where the negative electrode terminal is configured of a clad material, the positive electrode terminal may be configured of a clad material or one kind of metal (that is, not a clad material). When the positive electrode terminal is not configured of a clad material, a general positive electrode terminal structure can be used in this type of laminated battery without particular limitation, It is also possible that both the positive electrode terminal and the negative electrode terminal are configured of clad materials. For example, the positive electrode terminal is configured of a clad material composed of aluminum as the first metal 40 and nickel as the second metal 50, and the negative electrode terminal is configured of a clad material composed of copper as the first metal 40 and nickel as the second metal 50.

The first metal 40 and the second metal 50 are joined at a boundary 60. The boundary 60 is located substantially in the middle of the electrode terminal 30. In the illustrated example, the boundary 60 is shown linearly in the oblique direction, but this joining shape of the boundary 60 is not limiting. For example, joining may be performed by combining a concave portion and a convex portion.

The first metal 40 constitutes the entire area in the thickness direction Z from the boundary 60 to a central end portion 32 of the electrode terminal 30. The second metal 50 constitutes the entire area in the thickness direction Z from the boundary 60 to an outer end portion 34 of the electrode terminal 30. As shown by a broken line in FIG. 2, the proximity region of the boundary 60 including the boundary 60 is defined as a boundary region 62. Further, a region close to the boundary region 62 (excluding the boundary 60) is defined as a peripheral edge portion 64.

A tab film 70 composed of a resin material is arranged on the peripheral edge portion 64 of the electrode terminal 30 excluding the boundary region 62. The tab film 70 is a resin member that covers the electrode terminals 30 at the peripheral edge portion 64. The tab film 70 is arranged so as to be sandwiched between the electrode terminal 30 and the laminated exterior body 10 (specifically, the sealant layer 12). In the tab film 70, a pair of tab films 70 may be arranged on both sides (upper and lower) of the electrode terminals 30 in the thickness direction Z. Further, one tab film 70 may be wound around the electrode terminal 30.

The tab film 70 may or may not be arranged on the surface of the electrode terminal 30 which does not have a boundary 60 between the dissimilar metals (that is, is not configured of a clad material). Where the tab film 70 is arranged on the electrode terminal 30 which is not composed of the clad material, the tab film may be arranged so as to cover the entire electrode terminal 30, or it may be arranged so as to cover only a part of the electrode terminal 30.

As a method of adhering the tab film 70, the tab film 70 and the electrode terminal 30 may be heat-welded, or the tab film 70 may be heat-welded while being sandwiched between the electrode terminal 30 and the sealant layer 12. By interposing the tab film 70 between the electrode terminal 30 and the sealant layer 12, the electrode terminal 30 configured of a metal material and the sealant layer 12 configured of a resin material can be suitably adhered to each other.

The heat welding method (temperature, time, etc.) may be the same as the conventional well-known method, and is not particularly limited. For example, heat welding can be performed by heating and pressurizing for a predetermined time by using a welding device that is set so that the tab film 70 and the laminated exterior body 10 can be heat-welded in the range of 150° C. to 250° C.

Figure 2:
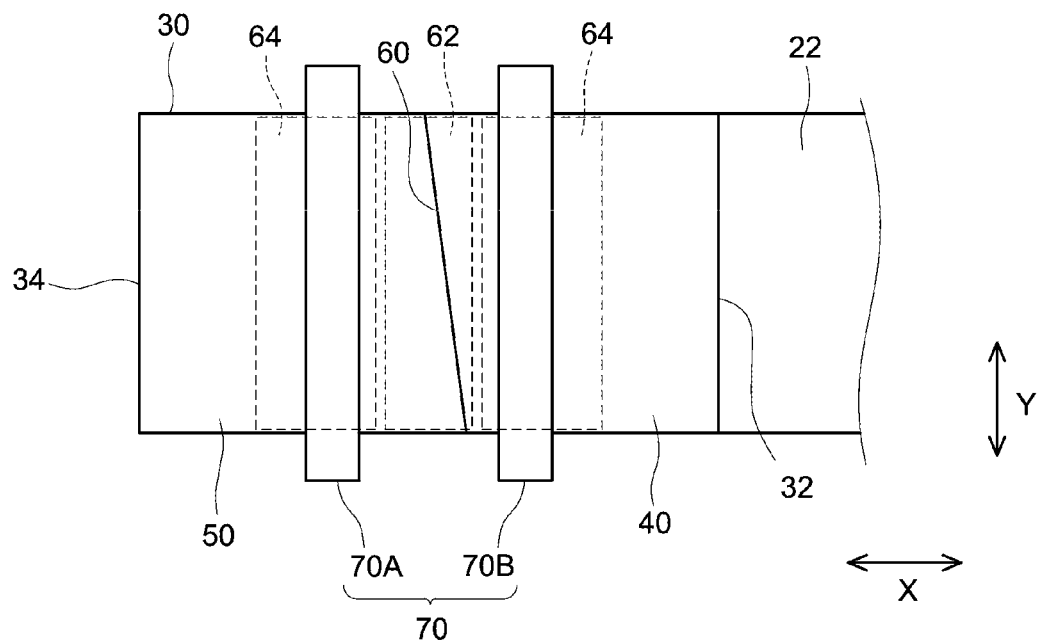
FIG. 2 schematically shows the vicinity of an electrode terminal according to an embodiment.
Figure 3:
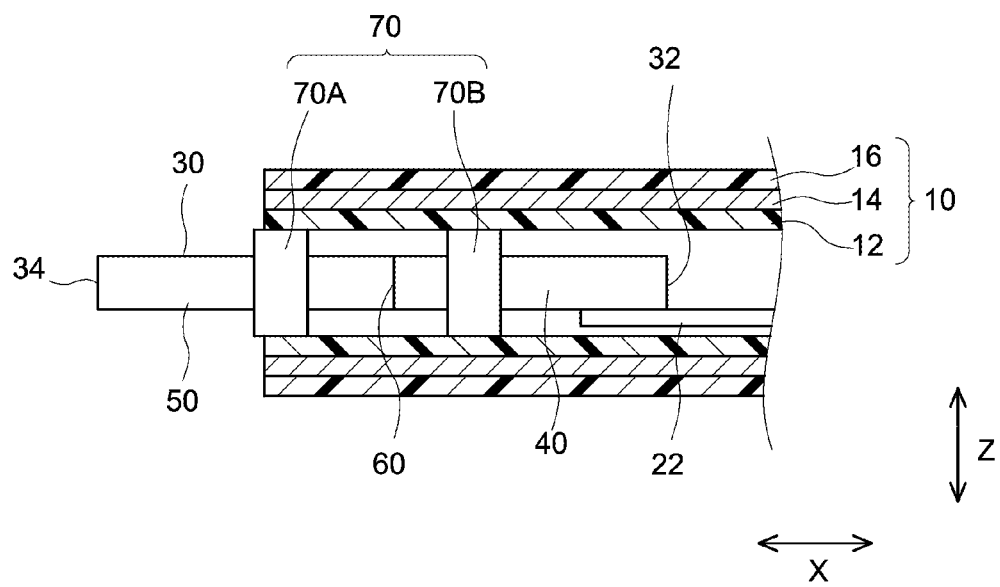
FIG. 3 schematically illustrates a cross section taken along the line III-III in FIG. 1.

As for the tab film 70, as shown in FIG. 2, a tab film 70A and a tab film 70B are arranged on the peripheral edge portion 64 on both sides of the boundary region 62. That is, the tab films 70A and 70B are arranged on the surfaces of the first metal 40 and the second metal 50, respectively. Since the first metal 40 and the second metal 50 are configured of different metal materials, characteristics thereof (thermal conductivity etc.) are different, and the adhesiveness to the tab film 70 is also different. With this configuration, different processing conditions can be set for heat welding of the first metal 40 and the tab film 70B and heat welding of the second metal 50 and the tab film 70A. For example, the above-mentioned heat welding temperature, heating, pressurizing time, and the like can be adjusted, as appropriate, in consideration of the adhesiveness between each metal and the tab film 70. As a result, processing defects when the tab film 70 is welded to the electrode terminals 30 are suppressed, and the boundary 60 can be adequately protected.

The material of the tab film 70 is required to be a resin material that melts at a temperature similar to that of the laminated exterior body 10 and exhibits suitable adhesiveness to both resin materials and metal materials. In addition, it is preferable that the durability against electrolytes be also excellent. Examples of such resin materials include polyolefin-based resins, acid-modified polyolefin-based resins, polyester-based resins, polystyrene-based resins, polyvinyl chloride-based resins, and the like. Examples of the polyolefin-based resin include polyethylene (PE), polypropylene (PP), and the like. Examples of the acid-modified polyolefin resin include maleic anhydride-modified polypropylene, maleic anhydride polyester, and the like. Examples of the polyester-based resin include polyethylene terephthalate (PET) and the like. Among them, an acid-modified polyolefin-based resin obtained by graft-modifying maleic anhydride or the like to a polyolefin-based resin is preferable from the viewpoint of exhibiting the above-mentioned effects at a higher level.

The tab film 70 may have a multilayer structure of two or more layers. Where the tab film 70 has a multilayer structure, it is preferably a film having a multilayer structure including a polyolefin layer.

The thickness of the tab film 70 is preferably 40 µm or more, more preferably 60 µm or more, and even more preferably 80 µm or more. Where the tab film 70 has a thickness within such a range, the function of adhering the electrode terminal 30 and the laminated exterior body 10 can be suitably exhibited. Further, the upper limit of the thickness of the tab film 70 is not particularly limited, but where the tab film 70 is too thick, the melting becomes insufficient, which may result in poor welding. From this point of view, the thickness of the tab film 70 is preferably 350 µm or less, more preferably 300 µm or less, and even more preferably 250 µm or less.

The length (depth) of the tab film 70 in the depth direction Y shown in FIG. 2 is designed to be longer than the length (depth) of the electrode terminal 30 in the depth direction Y. That is, at both ends of the tab film 70 in the depth direction Y, the tab film 70 is arranged without sandwiching the electrode terminals 30. With such a configuration, the gap generated between the electrode terminal 30 and the laminated exterior body 10 can be suitably filled with the tab film 70, and the sealing property can be improved.

The tab film 70 may be tapered so that the thickness of the film gradually decreases from the portion welded to the electrode terminal 30 (that is, the central portion) toward the outside in the depth direction Y. With such a configuration, the gap generated between the electrode terminal 30 and the laminated exterior body 10 can be more preferably suppressed.

The length (width) of the tab film 70 in the width direction X shown in FIG. 2 is not particularly limited as long as the tab film does not penetrate into the boundary region 62. For example, 3 mm or more is preferable, and 5 mm or more is more preferable. Further, it is preferable that the end portion of the tab film 70A be exposed to the outside from the laminated exterior body 10. This also has the effect of preventing the occurrence of a short circuit due to the conduction between the metal layer 14 of the laminated exterior body 10 and the electrode terminals 30.

A nickel plating layer (not illustrated) may be provided on the surface of the copper portion of the electrode terminal 30. Such a nickel plating layer can prevent copper from eluting from a portion configured of copper and can improve the adhesiveness to the tab film 70 configured of a resin material. As a result, the tab film 70 can be prevented from peeling off from the electrode terminal 30, and the boundary 60 can be adequately protected.

In order to improve the corrosion resistance of the copper portion of the electrode terminal 30, the surface layer portion of the nickel plating layer may be further surface-treated. A conventional well-known method such as chromate treatment, zirconium treatment, titanium treatment, and the like can be used as such a surface treatment without any particular limitation. Chromate treatment is particularly preferable from the viewpoint of improving the corrosion resistance of the copper portion of the electrode terminal 30 and the adhesiveness to the tab film 70.

A method of sealing the power generation element or the like with the laminated exterior body 10 will be described with reference to FIGS. 1 and 3. First, the positive electrode terminal and the negative electrode terminal are joined to the respective pole sides of the positive electrode current collecting tab and the negative electrode current collecting tab extending from the electrode body 20. Next, a pair of tab films 70A and a pair of tab films 70B are arranged on the peripheral edge portion 64 of at least one of the positive and negative electrode terminals that is configured of a clad material excluding the boundary region 62. Specifically, the tab films 70A and 70B are arranged and heat-welded so as to sandwich the electrode terminal 30 from both sides of the laminated battery 1 in the thickness direction Z. Wide surfaces of a pair of laminated exterior bodies 10 are arranged to face each other so as to be located inside the sealant layer 12 so as to cover the entire electrode body 20, the electrode terminals 30, and the tab films 70A and 70B from both sides in the thickness direction Z.

The sealant layer 12 is heat-welded at the welded portion 18 corresponding to the peripheral edges of the laminated exterior bodies 10 so that a bag-shaped sealed space is formed between the pair of laminated exterior bodies 10. As a result, the electrode body 20 is sealed inside the laminated exterior body 10. In the welded portion 18, the laminated exterior bodies 10 are welded in a state where the outer end portion 34 of the electrode terminal 30 is exposed to the outside of the laminated exterior body 10. Here, at the time of the above-mentioned heat welding, the tab films 70A and 70B arranged between the laminated exterior body 10 and the electrode terminal 30 are also heat-welded. Therefore, the adhesiveness of the electrode terminals 30 is improved, and the boundary 60 is sealed inside the laminated exterior body 10.

With such a configuration, it is possible to block the penetration of moisture, air, electrolyte (for example, electrolytic solution) and the like, and prevent electrolytic corrosion of the boundary 60.

Modified Form

Figure 4:
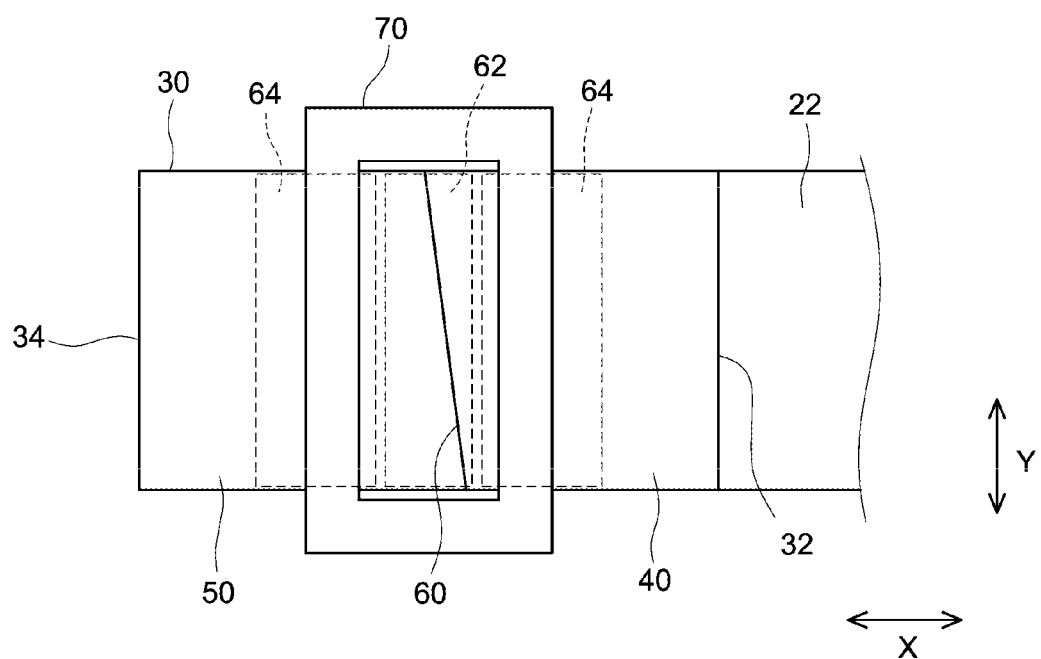
FIG. 4 schematically shows the vicinity of an electrode terminal according to another embodiment.

In the above-mentioned laminated battery 1, the configuration in which the tab films 70A and 70B are provided on the peripheral edge portion 64 excluding the boundary region 62 between the first metal 40 and the second metal 50 has been described. However, the form of the tab film 70 is not limited to the above-described embodiment. FIG. 4 is a diagram schematically showing the vicinity of the electrode terminal 30 according to a modified form.

A substantially square-shaped tab film 70 is arranged on the peripheral edge portion 64 of the electrode terminal 30 excluding the boundary region 62. The tab film 70 is a resin member that covers the electrode terminal 30 at the peripheral edge portion 64. In the tab film 70, a pair of tab films 70 is arranged on both sides (upper and lower) of the electrode terminal 30 in the thickness direction Z.

As described above, from the viewpoint of advantageously setting the processing conditions, the pair of tab films 70 are welded to the respective surfaces (on both sides in the thickness direction Z) of the first metal 40 and the second metal 50. In the above-described form, a gap is formed between the tab films 70A and 70B. In the modified form, the tab film 70 is arranged in a peripheral edge portion 64 excluding the boundary region 62 in a state where the gap between the tab films 70A and 70B is eliminated by forming the tab film 70 into a substantially square shape.

In the modified form, the pair of tab films 70 are also heat-welded to each other at both ends in the depth direction Y. As a result, the sealing property of the boundary region 62 is further improved, the penetration of moisture, air, electrolytes, and the like is suppressed, and corrosion of the boundary 60 can be prevented.

The laminated battery 1 can be used for various purposes. For example, it can be suitably used as a high-output power source (driving power source) for a motor mounted on a vehicle. While a type of the vehicle is not particularly limited, examples thereof include a plug-in hybrid electric vehicle (PHEV), a hybrid electric vehicle (HEV), and a battery electric vehicle (BEV). The laminated battery 1 can also be used in the form of a battery pack in which a plurality of laminated batteries 1 is electrically connected.

Although specific examples of the present disclosure have been described in detail hereinabove, these are merely examples and do not limit the scope of claims. The techniques described in the claims are inclusive of various changes and modifications of the specific examples illustrated above.

What is claimed is:

1. A laminated battery comprising:
    an electrode body having a positive electrode and a negative electrode;
    a laminated exterior body formed of rectangular laminated films inside which the electrode body is housed by welding the laminated films in a state where wide surfaces of the laminated films face each other; and
    positive and negative electrode terminals that are each electrically connected at a first end to the respective electrode of the electrode body and are exposed at another end opposite to the first end outside of the exterior body from a welded portion of the exterior body, wherein
    at least one of the positive and negative electrode terminals is configured of a plate-shaped clad material in which a first metal and a second metal, which are different from each other, are joined to each other;
    in the at least one terminal configured of the clad material, one end, which is connected to the respective electrode of the electrode body, is configured of the first metal, and the other end, which is exposed to the outside, is configured of the second metal;
    a tab film composed of a resin material is arranged on a surface of the first metal and a surface of the second metal of the clad material;
    a boundary region of the first metal and the second metal of the clad material is not exposed to the outside of the exterior body;
    the tab film is arranged at a peripheral edge portion close to the boundary region, excluding the boundary region, on a wide surface of the clad material; and
    the tab film is welded to the welded portion of the exterior body.

2. The laminated battery according to claim 1, wherein the negative electrode terminal is configured of the clad material, the first metal is configured of copper, and the second metal is configured of aluminum.

3. The laminated battery according to claim 1, wherein the positive electrode terminal is configured of the clad material, the first metal is configured of aluminum, and the second metal is configured of copper.

4. The laminated battery according to claim 2, wherein a nickel plating layer is provided on a surface of portions of the first metal that are configured of copper.

5. The laminated battery according to claim 1, wherein the tab film is an acid-modified polyolefin resin.

6. The laminated battery according to claim 1, wherein the thickness of the positive and negative terminals is 1 mm or less.

7. The laminated battery according to claim 3, wherein a nickel plating layer is provided on a surface of portions of the second metal that are configured of copper.

* * * * *